US012710542B2

(12) United States Patent
Ahmed et al.

(10) Patent No.: US 12,710,542 B2
(45) **Date of Patent: *Aug. 18, 2026**

(54) HYBRID DEPTH IMAGING WITH SPARSE SUBJECT IRRADIATION

(71) Applicant: Microsoft Technology Licensing, LLC, Redmond, WA (US)

(72) Inventors: Abdelrehim Ahmed, Santa Clara, CA (US); John Peter Godbaz, Sunnyvale, CA (US); Mahdieh Poostchi, Dublin, CA (US); Minseok Oh, Santa Clara, CA (US); Ling Zhu, Palo Alto, CA (US); Mukhil Azhagan Mallaiyan Sathiaseelan, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 601 days.

This patent is subject to a terminal disclaimer.

(21) Appl. No.: 18/313,875

(22) Filed: May 8, 2023

(65) Prior Publication Data

US 2024/0377538 A1 Nov. 14, 2024

(51) Int. Cl.
*G01B 11/22* (2006.01)
*G01B 11/25* (2006.01)
(Continued)

(52) U.S. Cl.
CPC ............ *G01S 17/894* (2020.01); *G01B 11/22* (2013.01); *G01S 7/4915* (2013.01); *G06T 7/50* (2017.01);
(Continued)

(58) Field of Classification Search
None
See application file for complete search history.

(56) References Cited

U.S. PATENT DOCUMENTS

| | | | | |
|---|---|---|---|---|
| 9,934,590 B1 * | 4/2018 | Cheng | .................. | G06V 10/435 |
| 2013/0076895 A1 * | 3/2013 | Aoki | .................. | G01B 11/2513 348/136 |

(Continued)

FOREIGN PATENT DOCUMENTS

| | | | | |
|---|---|---|---|---|
| CN | 113945951 * | 1/2022 | ........... | G01S 17/894 |
| WO | 2016076796 A1 | 5/2016 | | |

(Continued)

OTHER PUBLICATIONS

Hyte,Refael,"Phase Wrapping and its Solution for Indirect Time-of-Flight Depth Sensing", Retrieved From :https://medium.com/chronoptics-time-of-flight/phase-wrapping-and-its-solution-in-time-of-flight-depth-ensing-493aa8b21c42, Nov. 24, 2020,12Pages (Year: 2020).*

(Continued)

*Primary Examiner* — Beniyam Menberu
(74) *Attorney, Agent, or Firm* — Alleman Hall LLP

(57) ABSTRACT

A method enacted in a depth-imaging system comprises (a) modulating radiant output from an emitter at one or more modulation frequencies; (b) projecting the radiant output as a plurality of sparse-projection features; (c) acquiring a plurality of raw shutters on an imaging sensor array modulated at the one or more modulation frequencies; (d) triangulating a geometric estimate of depth to a subject locus reflecting a sparse-projection feature; and (e) returning a time-of-flight value of the depth based on a phase computed from the plurality of raw shutters and on the geometric estimate of the depth.

20 Claims, 11 Drawing Sheets

(51) Int. Cl.
*G01S 7/4915* (2020.01)
*G01S 17/894* (2020.01)
*G06T 7/50* (2017.01)
*G02B 27/10* (2006.01)

(52) U.S. Cl.
CPC ..................... *G02B 27/1086* (2013.01); *G06T 2207/10028* (2013.01)

(56) References Cited

U.S. PATENT DOCUMENTS

2016/0005179 A1 1/2016 Parfenov et al.
2018/0247424 A1 8/2018 Bleyer et al.
2019/0079192 A1* 3/2019 Fenton .................... G01S 17/42
2019/0147215 A1* 5/2019 Al-Kofahi ................. G06T 7/11 382/133
2020/0226765 A1* 7/2020 Wood ................... G06V 10/147
2021/0102892 A1 4/2021 Oron
2022/0357148 A1* 11/2022 Chen ...................... G01B 11/25
2024/0192370 A1* 6/2024 Masuno ................ G01S 17/894

FOREIGN PATENT DOCUMENTS

WO 2021113645 A1 6/2021
WO 2022224580 A1 10/2022

OTHER PUBLICATIONS

Oliver, “Understanding Indirect ToF Depth Sensing”, Retrieved From: https://devblogs.microsoft.com/azure-depth-platform/understanding-indirect-tof-depth-sensing/, Apr. 16, 2021, 7 Pages.
Whyte, Refael, “Phase Wrapping and its Solution for Indirect Time-of-Flight Depth Sensing”, Retrieved From: https://medium.com/chronoptics-time-of-flight/phase-wrapping-and-its-solution-in-time-of-flight-depth-sensing-493aa8b21c42, Nov. 24, 2020, 12 Pages.
International Search Report and Written Opinion received for PCT Application No. PCT/US2024/026921, Jul. 18, 2024, 15 pages.

* cited by examiner 12A
10A
10B
12B
10C
12C
10D
12D

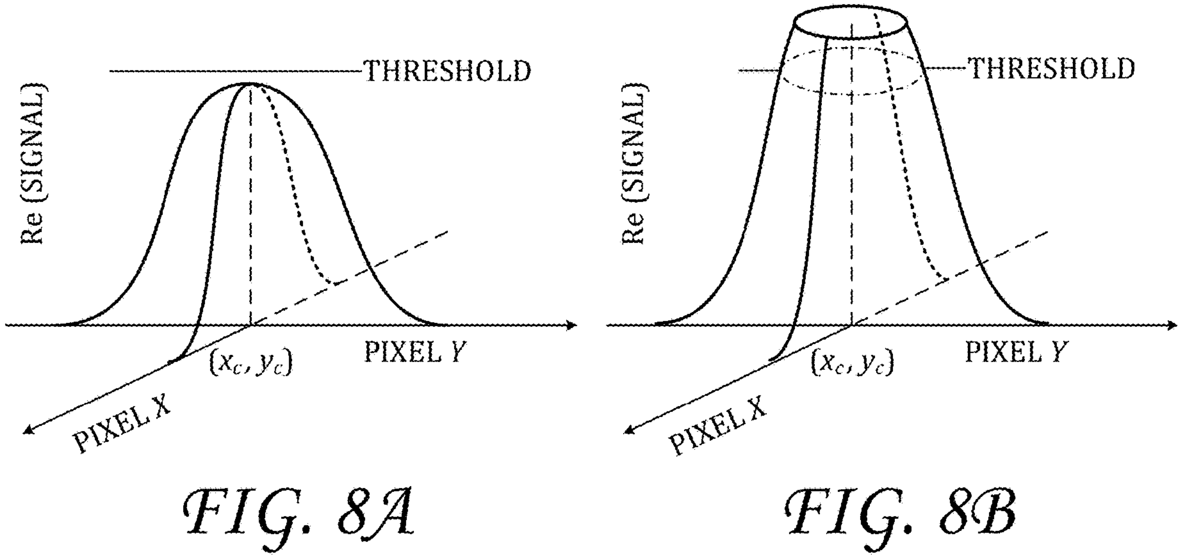
FIG. 8A
FIG. 8B
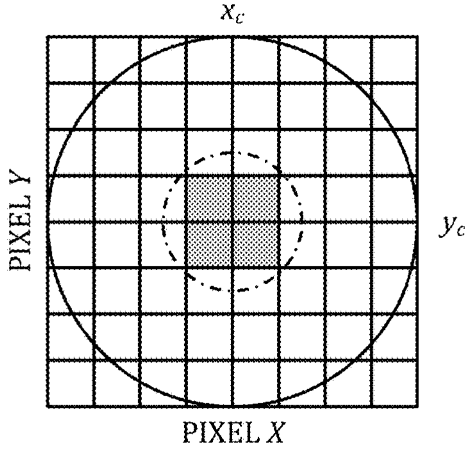
FIG. 8C

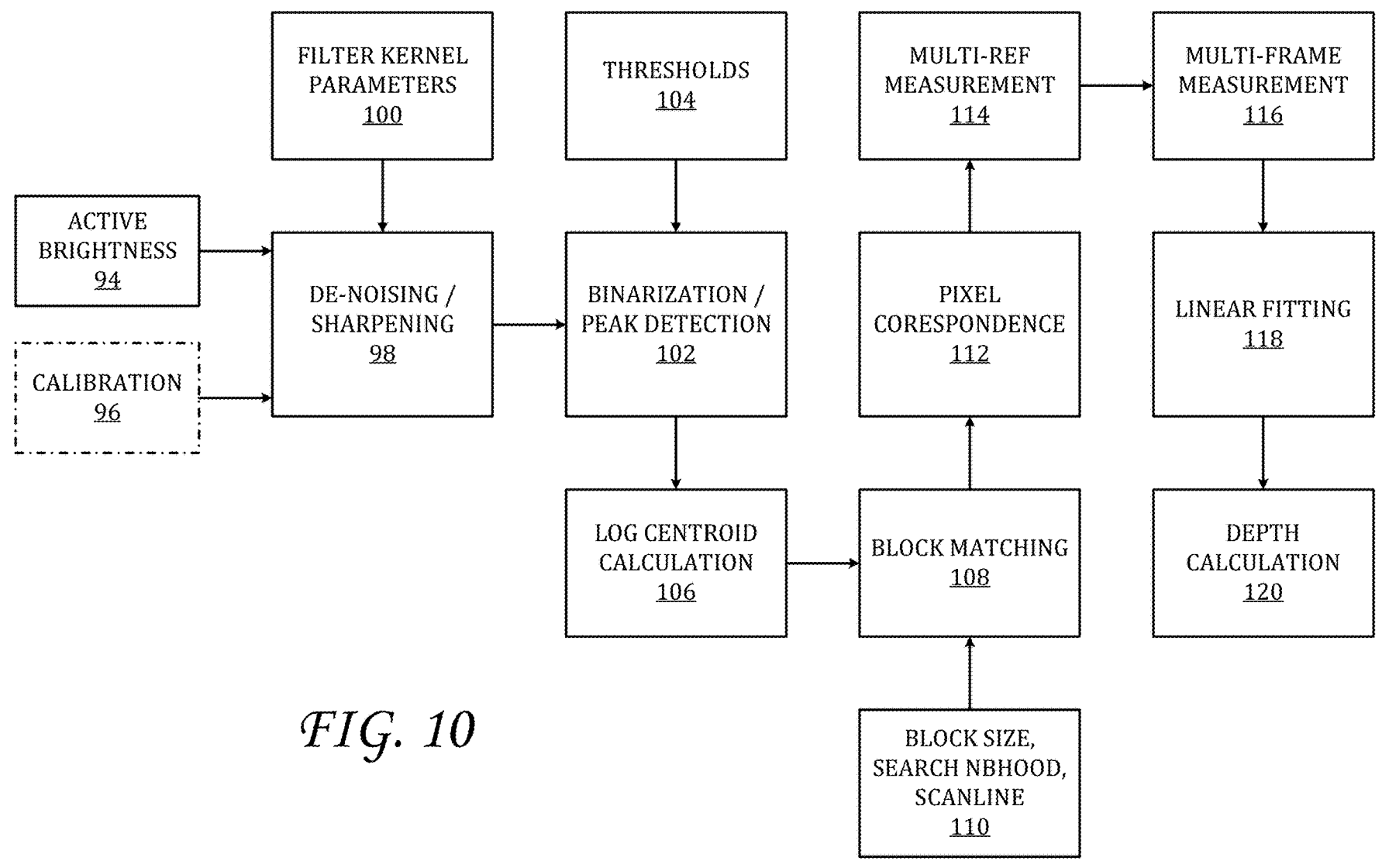

ACTIVE BRIGHTNESS 94

CALIBRATION 96

FILTER KERNEL PARAMETERS 100

DE-NOISING / SHARPENING 98

THRESHOLDS 104

BINARIZATION / PEAK DETECTION 102

LOG CENTROID CALCULATION 106

BLOCK MATCHING 108

BLOCK SIZE, SEARCH NBHOOD, SCANLINE 110

PIXEL CORESPONDENCE 112

MULTI-REF MEASUREMENT 114

MULTI-FRAME MEASUREMENT 116

LINEAR FITTING 118

DEPTH CALCULATION 120

FIG. 10

HYBRID DEPTH IMAGING WITH SPARSE SUBJECT IRRADIATION

BACKGROUND

Driven by advances in optical-sensor technology, digital imaging continues to expand into new application areas and device implementations. For example, low-cost depth-imaging systems are now used in various consumer-electronic devices. A depth-imaging system may operate according to stereo-optical, structured-light, or time-of-flight (ToF) principles and may support various functions beyond basic imaging. In a computer or video-game system, for example, image output from a depth-imaging system may be used to recognize user gestures that control the system, recognize faces, or provide other input. The reliability of gesture recognition, face recognition, and other input modalities depends upon the fidelity of the underlying depth imaging.

SUMMARY

One aspect of this disclosure relates to a method enacted in a depth imaging system. The method comprises: (a) modulating radiant output from an emitter at one or more modulation frequencies; (b) projecting the radiant output as a plurality of sparse-projection features; (c) acquiring a plurality of raw shutters on an imaging sensor array modulated at the one or more modulation frequencies; (d) triangulating a geometric estimate of depth to a subject locus reflecting a sparse-projection feature; and (e) returning a time-of-flight value of the depth based on a phase computed from the plurality of raw shutters and on the geometric estimate of the depth.

Another aspect of this disclosure relates to a depth-imaging system comprising an emitter configured to emit a modulated radiant output, a redistribution optic arranged optically downstream of the emitter and configured to sparsely project the radiant output onto a subject, an imaging sensor array configured to acquire a plurality of raw shutters of the subject, and a computer. The computer is configured to modulate the radiant output of the emitter and a charge-carrier collection at the imaging sensor at one or more modulation frequencies, construct a phase map of the subject based on the plurality of raw shutters, pinpoint in the phase map a plurality of bright areas corresponding each to a sparse-projection feature of the radiant output reflecting from the subject; and, for each of the plurality of bright areas: triangulate an estimate of depth to the corresponding sparse-projection feature reflecting from the subject, compute an aggregate phasor, and phase unwrap the aggregate phasor based partly on the estimate, to reveal a depth value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

FIG. 8A shows aspects of an example non-saturating bright area of a phase map.

FIGS. 8B and 8C show aspects of an example saturating bright area of a phase map.

FIGS. 9A, 9B, and 10 show example aspects of triangulation of a geometric depth estimate.

DETAILED DESCRIPTION

When used in connection with phase-based ToF imaging, sparse, structured irradiation offers several advantages over spatially continuous irradiation. Sparse irradiation provides (at the expense of some resolution) stronger return signal for a given radiant output, which is useful for imaging distant and low reflectance subjects. Ambient-light rejection is also more robust, as signal from areas between sparse-projection features can be subtracted from the signal corresponding to the features themselves. Sparse irradiation also enables hybrid depth imaging, where triangulation among the sparse-projection features provides an independent depth value suitable to assist phase unwrapping or other aspects of ToF imaging. Finally, sparse projection is useful for mitigating interference from multipath reflections—an outstanding challenge in many ToF applications.

Despite these advantages, sparse irradiation also presents challenges not typically encountered with spatially continuous irradiation. First, the image of a sparse-projection feature in a phase map typically extends over multiple pixels, so a robust aggregation strategy must be used to pinpoint the feature centroid at a desirable signal-to-noise ratio. Second, because the sparse-projection features reflect brightly from close-in or highly reflective subjects, some image pixels corresponding to the bright areas may be saturated in the acquired phase image and, therefore, not useful for computing the aggregate signal. This disclosure provides algorithms to address both issues. In some examples, bright areas corresponding to the sparse-projection features are pinpointed to high accuracy using, for example, a Laplacian-of-Gaussian detection approach where saturation is not an issue, and a moment-based approach otherwise. Signal from bright areas that exhibit saturation is aggregated intelligently, by computing the aggregated signal based on pixels in the peripheral part of the bright areas, under some conditions.

In some examples a triangulated, geometric depth estimate is computed for each of the bright areas of a phase map or active-brightness image. The geometric depth estimate can be sufficiently reliable to facilitate phase unwrapping of a single phase map into a depth image, thereby reducing the number of raw shutters required to build the depth image. This feature provides the important technical effects of reducing the power consumption and latency of the depth imaging system, and without sacrificing depth-imaging resolution.

Figure 1:
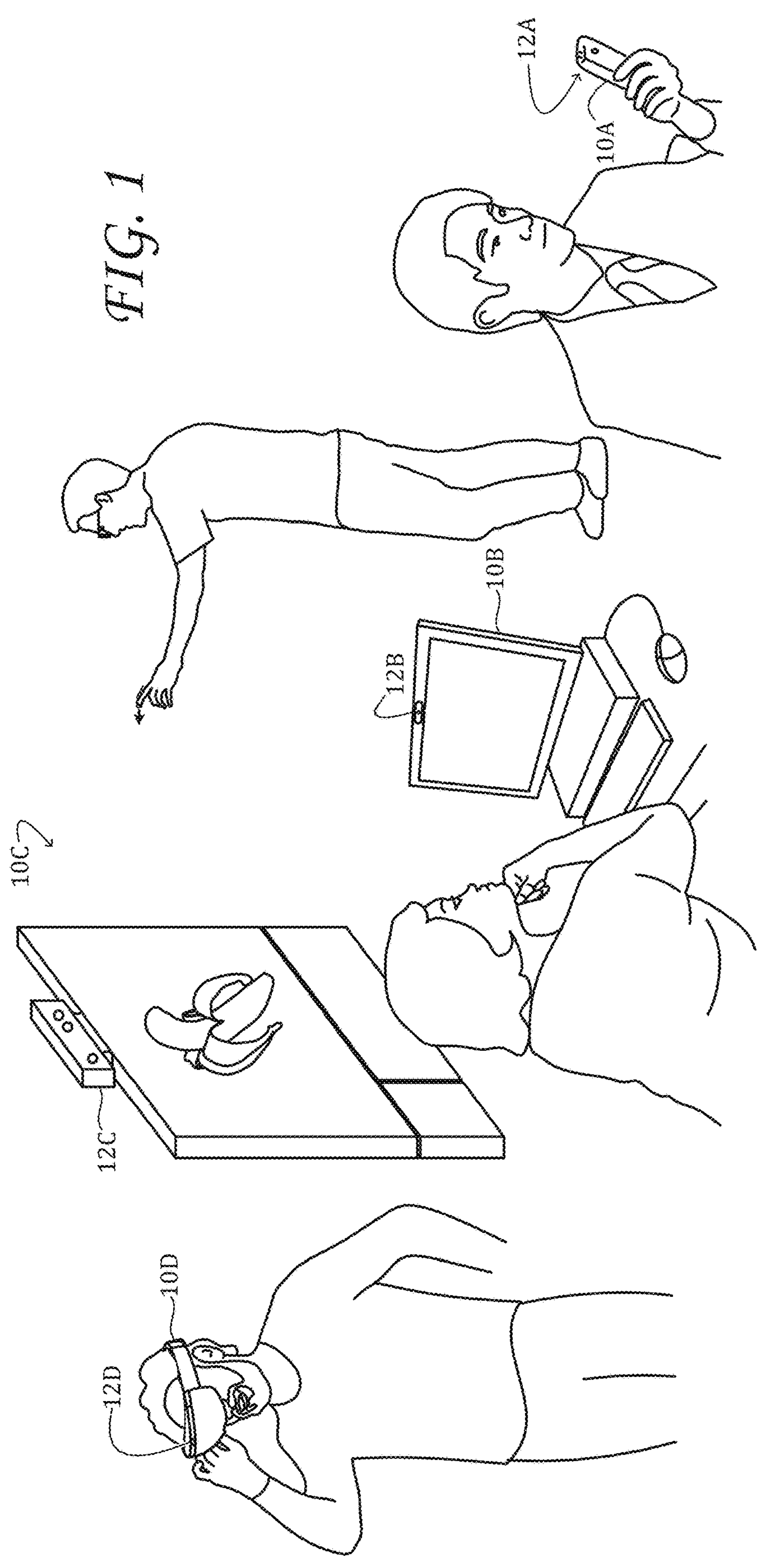
FIG. 1 shows aspects of four different electronic devices, each having embedded or peripheral depth-imaging system.

Turning now to the drawings, FIG. 1 shows aspects of four different electronic devices 10. Each electronic device is associated with a depth-imaging system 12. Electronic device 10A is a smartphone with an integrated, front-facing depth-imaging system 12A arranged under the display. Electronic device 10B is a personal computer with an integrated, user-facing depth-imaging system 12B. In these devices, the depth-imaging systems may be used for facial recognition of user, for example. Electronic device 10C is a video game system with a peripheral depth-imaging system 12C configured for gesture recognition. Electronic device 10D is a virtual-reality headset with an integrated, world-facing depth-imaging system 12D configured for machine vision. It will be noted that an electronic device having a world-facing depth-imaging system may also include a user-facing depth-imaging system, and vice versa. The description herein is applicable to these and other depth-imaging systems, in these and other device contexts.

As evident based on the range of examples in FIG. 1, depth-imaging systems 12 may differ from one implementation to another. The depth-imaging systems may also differ with respect to the depth-sensing technologies they employ. A stereo-optical depth imaging system is configured to acquire right and left stereo images of a subject, which, when co-registered, reveal a depth-dependent positional disparity between corresponding pixels of the images. The stereo-optical approach can be extended to systems that acquire three or more contributing images of a subject from different vantage points and reconstruct the subject's topology based on the resolved disparities. A structured-light depth-imaging system projects sparse, structured irradiation onto a subject. The structured irradiation may comprise numerous discrete features (e.g., dots or pins). The structured-light depth-imaging system images the discrete features reflected back from the subject, and, based on the apparent positions of the features, reconstructs the 3D topography of the subject. Other depth-imaging systems operate according to the time-of-flight (ToF) principle, where depth to any point on an imaged surface of a subject is computed based on the length of the time interval during which light emitted by the system travels out to that point and then back to the system. A ToF depth-imaging system measures this interval for many points on the imaged surface, creating a digital image where each depth coordinate is proportional to the measured interval. ToF depth-imaging technology has proliferated in recent years due to the availability of low-cost, phase-based ToF imaging sensor arrays. The term iToF stands for 'indirect' time-of-flight, and refers to ToF variants in which depth is computed indirectly, by unwrapping an accumulated phase map (vide infra).

Figure 2:
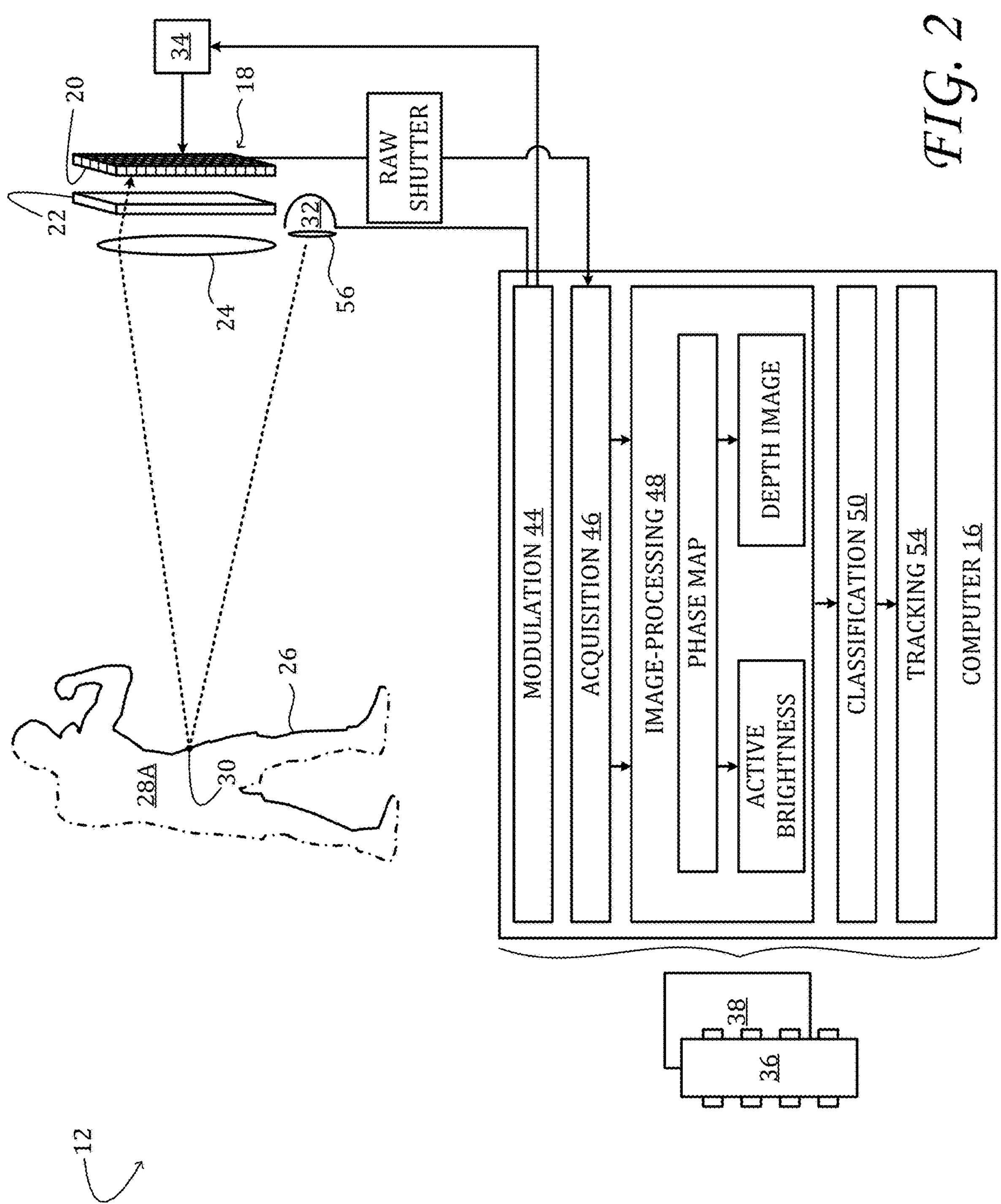
FIG. 2 shows aspects of an example indirect time-of-flight (iToF) depth-imaging system.

FIG. 2 shows aspects of an example iToF depth-imaging system 12 including a computer 16. The depth-imaging system includes an imaging sensor array 18 comprising plural sensor elements 20, a wavelength filter 22, and an objective lens 24. The objective lens is configured to focus an image of at least one surface 26 of subject 28A onto the imaging sensor array. The computer is configured to gather and process data from the various sensor elements and thereby construct one or more digital images of the subject.

A digital image may be represented as a numeric array with a value $S_j$ provided for each of a set of pixels (X, Y). In the example of FIG. 2, the X, Y position of each pixel of a digital image is mapped to an associated element 20 of imaging sensor array 18, and, via objective lens 24, to a corresponding locus 30 of surface 26. In some examples, the mapping of image pixels to sensor elements may be a 1:1 mapping, but other mappings may be used as well, such as 1:4, 4:1, and others. In some examples, depth-imaging system 12 may be configured to acquire a time-resolved sequence of digital depth images of the subject—i.e., depth video.

The dimensionality of each $S_j$ value of a digital image is not particularly limited. In some examples, $S_j$ may be a real- or integer-valued scalar that specifies the brightness of each pixel $(X, Y)_j$. In some examples, $S_j$ may be a vector of real or integer values that specifies the color of each pixel $(X, Y)_j$ using scalar component values for red, green, and blue color channels, for instance. In some examples, each $S_j$ may include a complex value $a+b\sqrt{-1}$, where a and b are integers or real numbers. As described in greater detail below, a complex value $S_j$ may be used to represent the signal response of the sensor elements of an iToF depth-imaging system that employs continuous-wave (CW) modulation and phase estimation to resolve radial distance.

Continuing now in FIG. 2, to enact phase-based ToF imaging, depth-imaging system 12 includes a modulated emitter 32 and an imaging sensor array 18 with a modulated electronic shutter 34. The emitter is configured to emit a radiant output, which may be modulated by suitable drive circuitry (vide infra). The emitter may comprise an infrared or near-infrared light-emitting diode (LED), LED laser, or other modulated laser, for example. In some configurations a visible-light emitter may be used alternatively. The imaging sensor array is configured to acquire a plurality of component images of the subject. The imaging sensor array may be a high-resolution array of complementary metal-oxide semiconductor (CMOS) sensor elements 20. Other depth-imaging systems may include different optical, emitter and/or sensor-array variants—a charge-coupled device (CCD) imaging sensor array, a microlens objective array, etc.

Electronic shutter 34 may take the form of a controlled voltage bias applied concurrently to certain electrode structures of the various sensor elements 20 of imaging sensor array 18. In some examples, the electrode structures receiving the controlled voltage bias may include current collectors that, depending on the level of the voltage bias, cause photoelectrons created within the sensor elements to drift to the current collectors and be measured as current. In some examples, the electrode structures receiving the controlled voltage bias may include gates that, depending on the level of the voltage bias, encourage or discourage the photoelectrons to drift towards the current collectors.

Computer 16 includes a logic system 36 and, operatively coupled to the logic system, a computer-memory system 38. The computer-memory system may hold data, such as digital-image data, in addition to instructions that, when executed by the logic system, cause the logic system to undertake various acts. For example, the instructions may cause the logic system to instantiate one or more machines or engines as described herein. In the example shown in FIG. 2, instructions held in the computer-memory system cause the logic system to instantiate a modulation engine 44, an acquisition engine 46, an image-processing engine 48, a downstream classification machine 50, and a tracking engine 54. Based on this or any other suitable processing architecture, the computer may be configured to execute the methods herein.

Modulation engine 44 is configured to synchronously modulate emitter 32 of depth-imaging system 12 and electronic shutter 34 of imaging sensor array 18. In some examples, the emitter and the electronic shutter are modulated at one or more pre-determined frequencies, with a pre-determined, angular phase offset φ' controlling the retardance of the electronic-shutter modulation relative to the emitter modulation. In some examples, 'modulation', as used herein, refers to a sinusoidal or digitized quasisinusoidal waveform, which simplifies analysis. This feature is not strictly necessary, however.

As noted above, imaging sensor array 18 images the component of the reflected irradiation that lags the emitter modulation by each of a series of pre-determined phase offsets φ'. Acquisition engine 46 is configured to interrogate the imaging sensor array to retrieve a resulting signal value $S_j$ from each sensor element 20. One digital image captured in this manner is called a 'raw shutter.' A raw shutter may be represented as a numeric array with a φ'-specific real intensity value $S_j$ provided for each sensor element and associated with coordinates $(X, Y)_j$ that specify the position of that sensor element in the imaging sensor array.

Image-processing engine 48 is configured to furnish one or more derived digital images of subject 28 based on one or more contributing digital images of the subject. For instance, from three or more consecutive raw shutters acquired at three or more different phase offsets φ', the image-processing engine may construct a 'phase map' that reveals the actual, depth-specific phase lag φ of the irradiation reflecting back to each sensor element. A phase map is a numeric array with $\varphi_j$ specified for each sensor element j and associated with coordinates (X, Y); that specify the position of that sensor element in the imaging sensor array. In some implementations, each signal value $S_j$ is a complex number $a+b\sqrt{-1}$, where a is the signal component in phase with the emitter modulation, and b is the signal component that lags the emitter modulation by 90°. In this context, the complex signal value $S_j$ is related to modulus $\|S_j\|$ and phase lag φ by $$S_j = \|S_j\| e^{-i\varphi} \tag{1}$$

In implementations in which the phase-independent reflectance of the subject is also of interest, image-processing engine 48 may process a given phase map by replacing each complex signal value $S_j$ by its modulus, or by the square of its modulus. An image of that kind is referred to herein as an 'active-brightness' image.

Using data from a single phase map or set of component raw shutters, image-processing engine 48 may conditionally estimate the radial distance $Z_j$ between the depth-imaging system and the surface point imaged at each sensor element j. More particularly, the image-processing machine may solve for the depth using $$(\varphi/4\pi) + (N/2) = (Z_j f/c), \tag{2}$$

where c is the velocity of light, $f$ is the modulation frequency, and N is a non-negative integer.

The solution above is unique when the entire range of depth values $Z_j$ is no larger than half of the distance traveled by light in one modulation period, $c/(2f)$, in which case N is a constant. Otherwise, the solution is underdetermined and periodic. In particular, surface points at depths that differ by any integer multiple of $c/(2f)$ are observed at the same phase lag φ. A derived digital image resolved only to that degree—e.g., data from a single phase map or corresponding triad of raw shutters—is said to be 'aliased' or 'wrapped'.

In order to resolve depth in ranges larger than $c/(2f)$, image-processing engine 48 may compute additional phase maps using raw shutters acquired at different modulation frequencies. In some examples three frequencies may be used; in other examples two frequencies are sufficient. The combined input from all of the raw shutters (nine in the case of three frequencies, six in the case of two) is sufficient to uniquely determine each $Z_j$. Redundant depth-imaging of the same subject and image frame to provide a non-periodic depth value is called 'de-aliasing' or 'unwrapping'. Although this approach is broadly applicable, three caveats should be noted. First, the depth-imaging system consumes an increment of energy to acquire and process each and every raw shutter. In battery-powered devices, therefore, it is desirable to limit the number of modulation frequencies and image captures. Second, the acquisition of each and every raw shutter requires an increment of time, and may contribute to latency in high-speed depth-video applications. Third, the resolution of each depth value measured by iToF is related fundamentally to the modulation frequency—viz., the standard deviation and the modulation frequency are inversely related. Thus, when raw shutters acquired at lower modulation frequencies are incorporated to improve or avoid phase unwrapping, the overall resolution is degraded. The degradation can be cured by folding in additional raw shutters acquired at higher modulation frequencies, but only at the expense of additional power and latency.

Derived from one or more phase maps, a depth image may be represented as a numeric array with a radial distance value $Z_j$ provided for each pixel and associated with coordinates $(X, Y)_j$ that specify the pixel position. A depth image of this kind may be referred to as a 'radial distance map'. However, other types of depth images (e.g., depth images based on other coordinate systems) are also envisaged. Irrespective of the coordinate system employed, a depth image is an example of a derived digital image derived from plural contributing digital images. In this example, the contributing digital images may include a set of phase maps acquired at different modulation frequencies, or, a corresponding set of raw shutters.

Image-processing engine 48 may be configured differently for use with other types of depth-imaging systems. In stereo-optical depth-imaging systems, the image-processing engine may compute depth based on the horizontal disparity (i.e., lateral offset) between a pixel of one contributing digital image (e.g., a right stereo image) and a corresponding pixel of another contributing digital image (e.g., a left stereo image). In a structured-light depth imaging system, where the contributing digital image exhibits a reflection of sparse, structured irradiation from the subject, the image-processing engine may be configured to compute depth estimates based on geometric analysis of the reflection, including triangulation of the depth coordinate Z based on the X, Y coordinates of the bright areas corresponding to the sparse-projection features and the calibrated geometry of the emitter and the objective lens. In these and other examples, the image-processing engine processes one or more contributing digital images to furnish a derived digital image in the form of a depth image. As in the previous example, a depth image may be represented by a numeric array with a depth value $Z_j$ provided for each pixel and associated with coordinates $(X, Y)_j$ that specify the pixel position.

In some implementations, the pixels of a digital image may be classified into one or more segments based on object type. To that end, downstream classification machine 50 may be configured to enact object-type classification, which may include a single-tier or multi-tier (i.e., hierarchical) classification scheme. In some examples, pixels may be classified as foreground or background. In some examples, a segment of pixels classified as foreground may be further classified as a human or non-human segment. In some examples, pixels classified as human may be classified still further as a 'human head', 'human hand', etc. A classified digital image may be represented as a numeric array with a signal value $S_j$ and class value $C_j$ provided for each pixel and associated with coordinates $(X, Y)_j$ that specify the pixel position. A classified digital image is yet another example of a derived digital image, derived from one or more contributing digital images.

In some depth-video implementations, tracking engine 54 may employ model fitting to track the motion of classified depth-image segments from frame to frame. In examples in which the subject includes a human being, for example, classified segments corresponding to the hands may be segmented from the rest of the subject. The hand segments can then be tracked through the sequence of depth-image frames and/or fit to a kinematic model. Tracked segments may be used as input for virtual-reality video games or as gesture input for controlling a computer, for example. Naturally, this disclosure extends to various other segmentation and tracking tasks that may be performed on the output of a depth-imaging system. In any configuration that employs sparse, structured irradiation, the tracking engine may track, from frame to frame, any bright area corresponding to a sparse-projection feature reflected from the subject.

Continuing in FIG. 2, in typical iToF depth-imaging systems, every locus of the illuminated surface of the subject receives irradiation from the emitter. By contrast, emitter 32 of depth-imaging system 12 is arranged optically upstream of redistribution optic 56 and thereby configured to sparsely project its radiant output onto subject 28A. To that end, the redistribution optic is configured to collect and angularly redistribute the radiant output from the emitter into numerous, discrete sparse-projection features. In some examples, each sparse-projection feature comprises a dot. In other examples, each sparse-projection feature comprises a pin. As used herein, a 'dot' is a disk-shaped feature with maximum intensity at an interior centroid point (not necessarily the center of the disk), and approaching null intensity with increasing distance from the centroid. A 'pin' is an elongate feature with maximum intensity at an interior centroid line (not necessarily the bisector of the pin), and approaching null intensity with increasing lateral distance from the centroid line. As used herein, a 'centroid' is the first moment of the pixel-brightness value integrated (or discretely accumulated) over a given bright area along the coordinates appropriate for the dimensionality of the bright area (e.g., two dimensions for a dot, one dimension for a pin). The term 'barycenter' can also be used to refer to a centroid.

Dots may be arranged in a regular (e.g., rectangular or hexagonal) pattern or non-regular and/or pseudorandom pattern. Pins may be arranged in a mutually parallel series. In some examples, sparse-projection features may be spaced evenly in angle space (azimuth and/or elevation angle). In other examples the sparse-projection features may be arranged in a pseudo-random pattern, to avoid aliasing issues. In order to redistribute the radiant output, the redistribution optic may include a diffraction grating or, in other examples, a series of refracting features, such as lenslets. In some examples the redistributed radiant output projects from an annular-shaped aperture surrounding objective lens 24 of the imaging system. In some examples the redistribution optic may comprise an active optic (not shown in the drawings) that can be switched on to provide sparse, structured irradiation and switched off to provide 'flood' (spatially continuous) irradiation. In cases where a pseudorandom pattern is used instead of a regular pattern, it may be easier to uniquely identify each dot, simplifying the calculation of any range-induced shift in the dot location due to the baseline between the illumination source and imaging components.

The configuration shown in FIG. 2 admits of several advantages over flood irradiation. First, because the radiant output of emitter 32 is concentrated onto discreet loci of the subject (as opposed to being distributed continuously), distant and low-reflectance subjects provide stronger (though lower-resolution) return signal. Second, highly accurate ambient-light rejection is available by collecting null signal between the sparse-projection features and subtracting the null signal from the nearby, irradiated loci under the sparse-projection features. Third, the sparse-projection features also support geometric (e.g., triangulation-based) depth imaging, which can be used to compute an independent, geometric depth estimate. In some examples, due to its wider dynamic range, the geometric depth estimate can be used to improve the performance of the phase-unwrapping algorithm enacted by image-processing engine 48. Fourth, sparse projection is very useful for mitigating interference from multi-path reflections in iToF imaging. This aspect is now described with reference to FIGS. 3 through 6.

Figure 3:
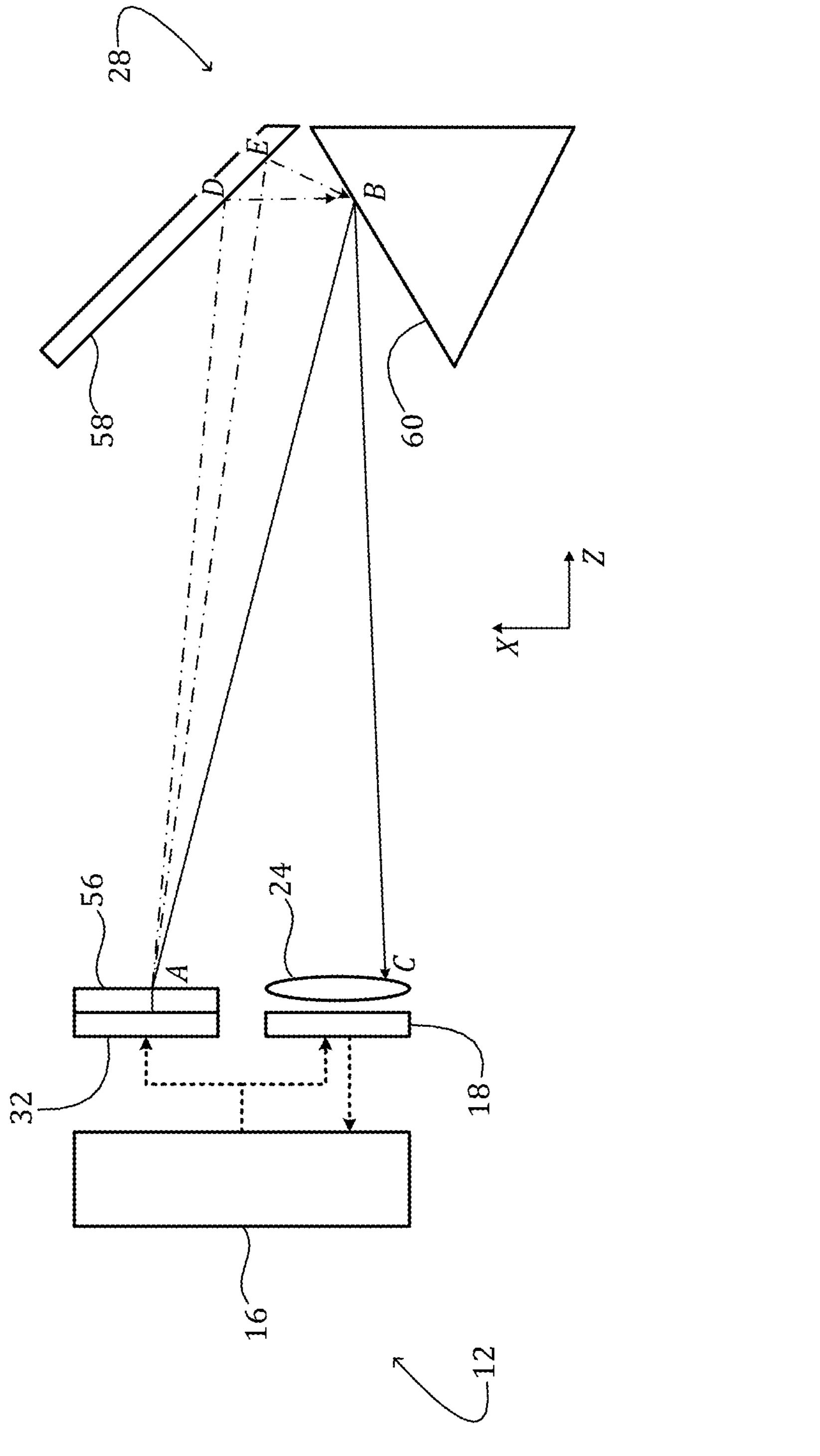
FIG. 3 shows aspects of an example subject with features that may reduce iToF depth-imaging fidelity.

In FIG. 3 the desired light path for assessing the depth of locus B is the two-segment path ABC. However, light from emitter 32 may also reach objective lens 24 along ray BC along numerous other paths, including the three-segment paths ADBC and AEBC. Light reflected along a three-segment path is received at a larger-than-expected phase angle, which erroneously lengthens the measured depth to locus B.

In the illustrated example, the indirect reflections are a consequence of the orientation of first area 58 relative to second area 60, which defines a concavity. Although reflection along any three-segment path will typically be less intense than the direct, two-segment reflection, various factors may increase the significance of indirect reflection as a noise source. For instance, if first area 58 is significantly reflective—and especially diffusely reflective—of the emitter light, then the amount and angular content of the indirect reflection may be increased. Naturally, the larger the size of first area 58, the greater will be the amount of indirectly reflected light that reaches the objective lens 24 along BC.

The approach herein addresses this issue while providing still other advantages. Image-processing engine 48 may be configured to map the subject based on the signal from sensor elements that image subject loci directly under the sparse-projection features, while omitting or weighting negatively the signal from sensor elements that image subject loci between the sparse-projection features. This approach increases the signal-to-noise ratio for sensing the depth of subject loci under the sparse-projection features, because it reduces the effective area of the subject from which indirect reflections can occur. At the same time, the intensity of the direct, two-segment reflection from the sparse-projection features is increased, because the entire output of the emitter is concentrated on such features. It will be noted also that dots or other sparse-projection features projected onto the subject will change location in the acquired images as a function of depth. Accordingly, the imaging system can be calibrated such that each trajectory is known, and data that is inconsistent with the trajectories can be rejected as noise (due to subject properties such as retroreflection, specular reflection, multi-path reflection, etc.).

Figure 4:
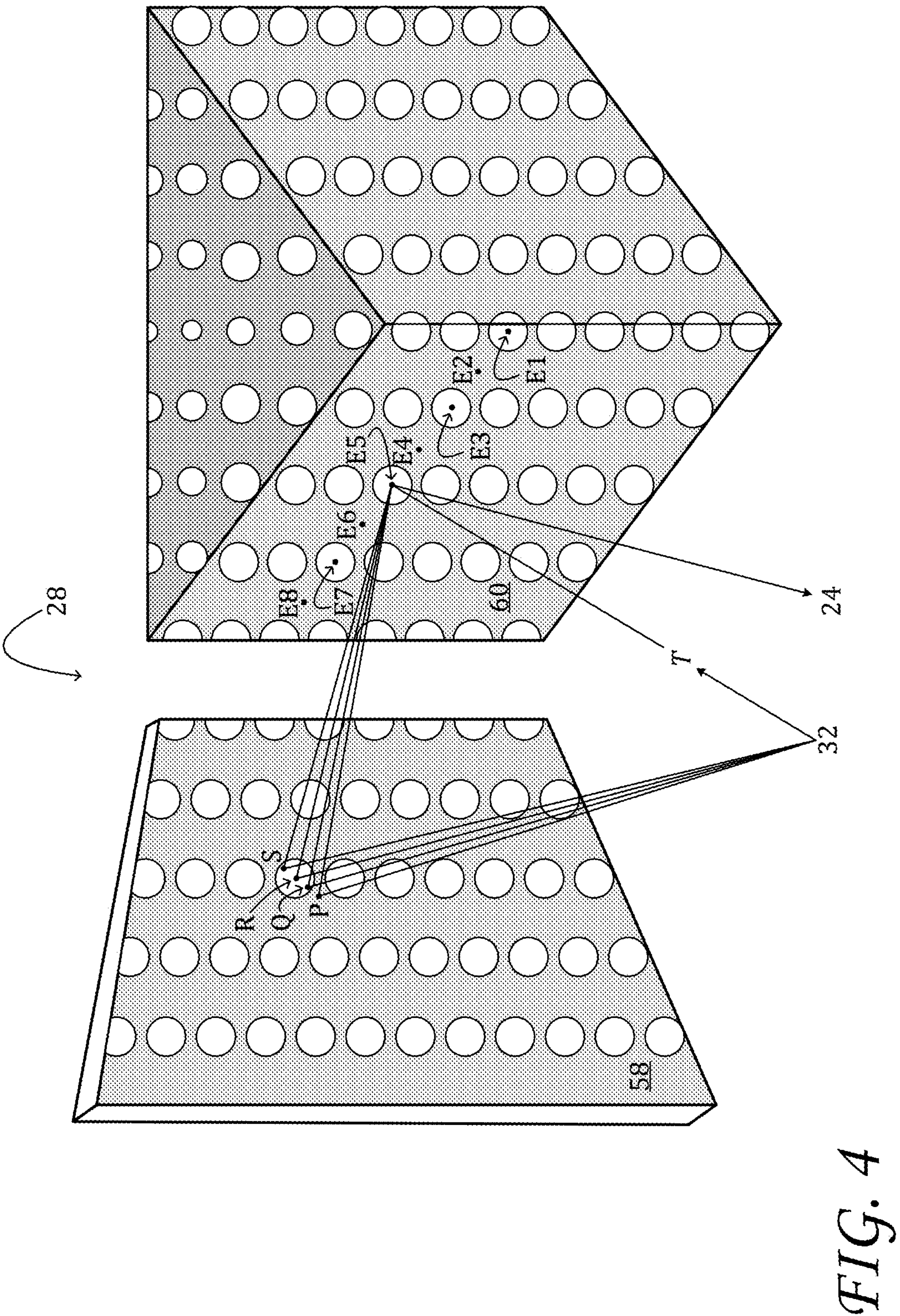
FIGS. 4 through 6 provide a comparison of iToF depth-imaging fidelity for the subject of FIG. 3 under different forms of irradiation.
Figure 5:
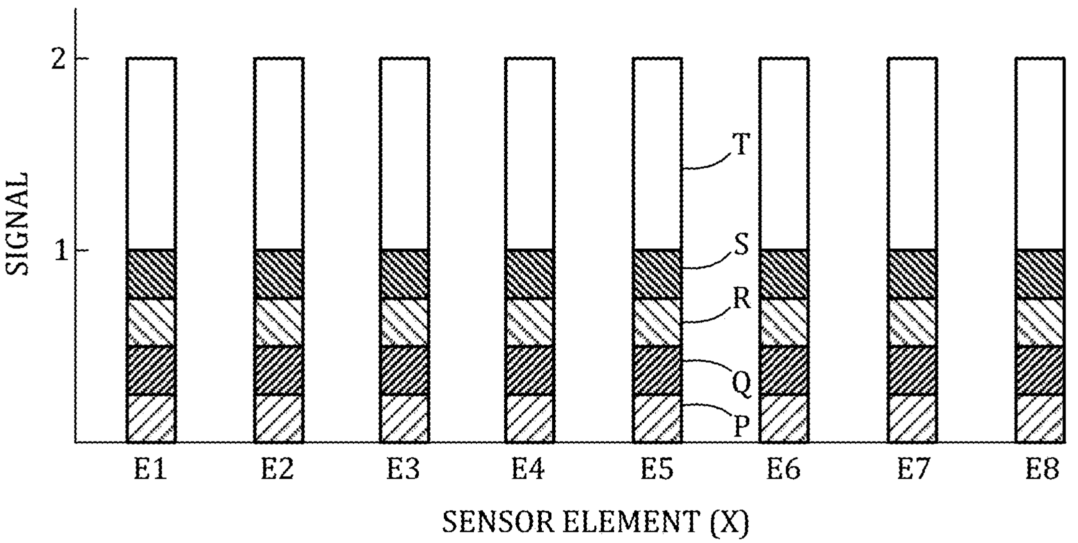
Figure 6:
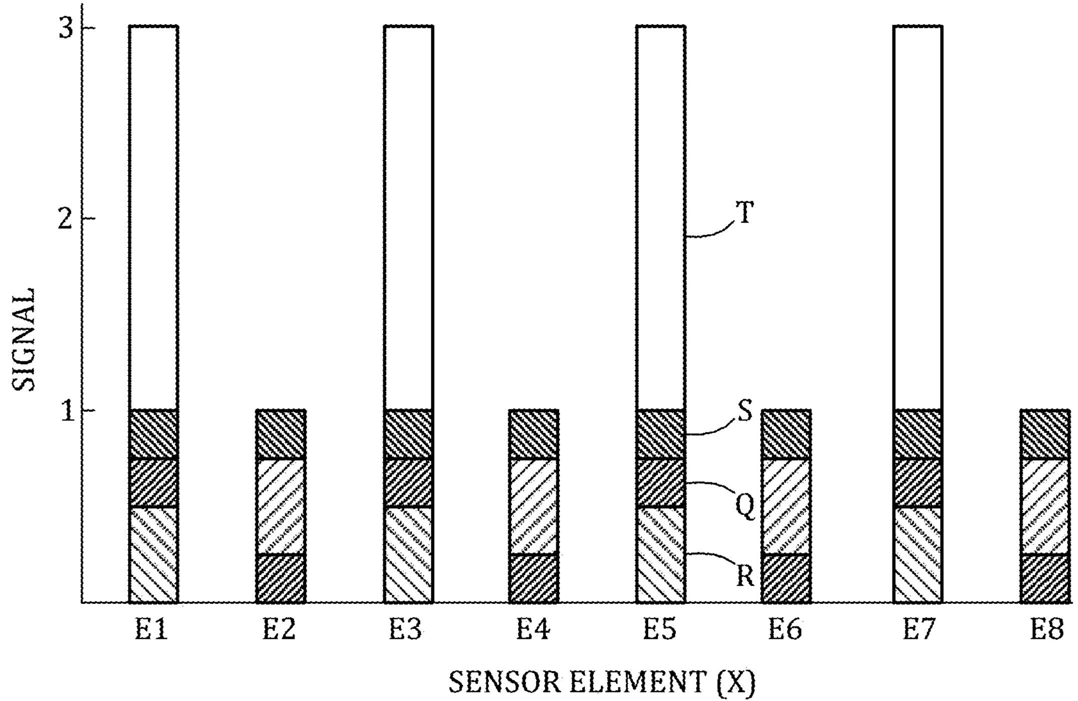

The modeling results of FIGS. 5 and 6 illustrate the basic advantage of the depth-imaging approach now disclosed. In these graphs, the height of each labeled vertical bar (E1 through E8 in FIGS. 5 and 6) represents overall signal intensity from a sensor element of the imaging sensor array that images a corresponding locus of second area 60. These loci are assigned a corresponding number in preceding FIG. 4. In FIGS. 5 and 6, each vertical bar is divided into sections that show contributions to the signal intensity from the direct, two-segment reflection and from several three-segment reflections. For each numbered sensor element, signal intensity from the direct, two-segment path is shown as an unshaded block, while the differently shaded blocks represent signal intensity from different three-segment reflections. At sensor element E5, for instance, shaded block P represents signal intensity from a three-segment reflection from locus P (of FIG. 4), shaded block Q represents signal intensity from locus Q, shaded block R represents signal intensity from locus R, and shaded block S represents signal intensity from locus S. Unshaded block T, at sensor element E5, represents signal intensity from the direct two-segment reflection.

The comparative result of flood irradiation of the subject is illustrated in FIG. 5. In this example, the signal intensity from the two-segment reflection is equal, at every sensor element, to the combined signal intensity from the four three-segment reflections, so that the total signal-to-noise ratio is 1:1. FIG. 6 illustrates the result of sparse irradiation with a rectangular array of sparsely projected dots as shown in FIG. 4. Sensor elements E1, E3, E5, and E7 image loci under a dot, while E2, E4, E6, and E8 image loci between the dots. In the scenario represented in FIG. 6, the overall power delivered by the probe emitter is the same as in FIG. 5, but this power is concentrated exclusively on the dots. Accordingly, the signal intensity for the two-segment reflection is doubled under pixels E1, E3, E5, and E7. At example pixel E5, the signal intensity corresponding to the three-segment reflection via brightly illuminated locus R doubles also, but the one from dark locus P disappears entirely, and the intensities of the remaining three-segment reflections (Q and S) remain unchanged. Thus, the signal-to-noise ratio for depth imaging under the sparsely projected dots is overall doubled to 2:1. Between the dots all signal intensity from the two-segment reflection vanishes, because these areas are not directly irradiated by emitter. Rather, all of the accumulated signal is due to a distribution of three-segment reflections.

In embodiments where rows of dots or continuous rows are used, the orientation of the rows may be adjusted according to the geometry of the imaged subject to more effectively suppress indirect reflections. Accordingly, depth-imaging system 12 may include additional componentry for dynamically rotating the rows during image acquisition, to minimize a predicted or computed depth-sensing error. It will be noted that the patterns of dots or pins are among many possible patterns having alternating bright and dark features. Additional patterns include a grid of continuous rows and columns, for instance.

Despite its advantages, sparse, structured irradiation introduces challenges for iToF imaging not encountered with flood irradiation. First, the dot locations must be accurately determined in the phase maps, so that relevant phase information can be extracted, even under conditions in which the signal-to-noise (S/N) ratio is sub-optimal. Second, every sparse-projection feature will typically be spread across a plurality of sensor elements of the imaging sensor array. Thus, in order to extract a measurement with the highest available S/N, signal from a plurality of sparse-projection features must be aggregated according to a suitable algorithm. Third, sparse, structured irradiation typically amplifies the dynamic-range limitations of array-based imaging. In some scenarios, highly reflective or close-up objects may be patterned with very bright dots that saturate the sensor elements corresponding to the interiors of the sparse-projection features. This disclosure addresses each of the above issues and provides additional advantages. In particular, it provides improved algorithms for (a) pinpointing the bright areas of a phase map corresponding to the sparse-projection features and (b) overcoming the dynamic-range limitation to achieve a dynamic range beyond what can be achieved using continuous irradiation. These algorithms are incorporated into the method below. The term 'bright area' refers herein to a locus of a digital image, such as a phase map acquired by the imaging system, that corresponds to one of the sparse-projection features of the emitter irradiation reflected back from the subject. Generally speaking, pixels comprising a bright area will have brightness values exceeding those of the pixels outside of any bright area. A bright area need not be bright in an absolute sense, however, as the magnitude of the excess will depend on the S/N ratio of the measurement and other factors. The term 'pinpointing' is synonymous with 'locating' and should not be construed to require an absolute precision of any degree. Nevertheless, some but not all of the methods herein include a step in which a bright area is identified or bracketed to a given precision (for the purpose of determining whether any pixels in the bright area are saturated), followed by a step in which the centroid of the bright area is located with greater precision. In such examples, the term 'pinpointing' is reserved for the latter step.

Figure 7:
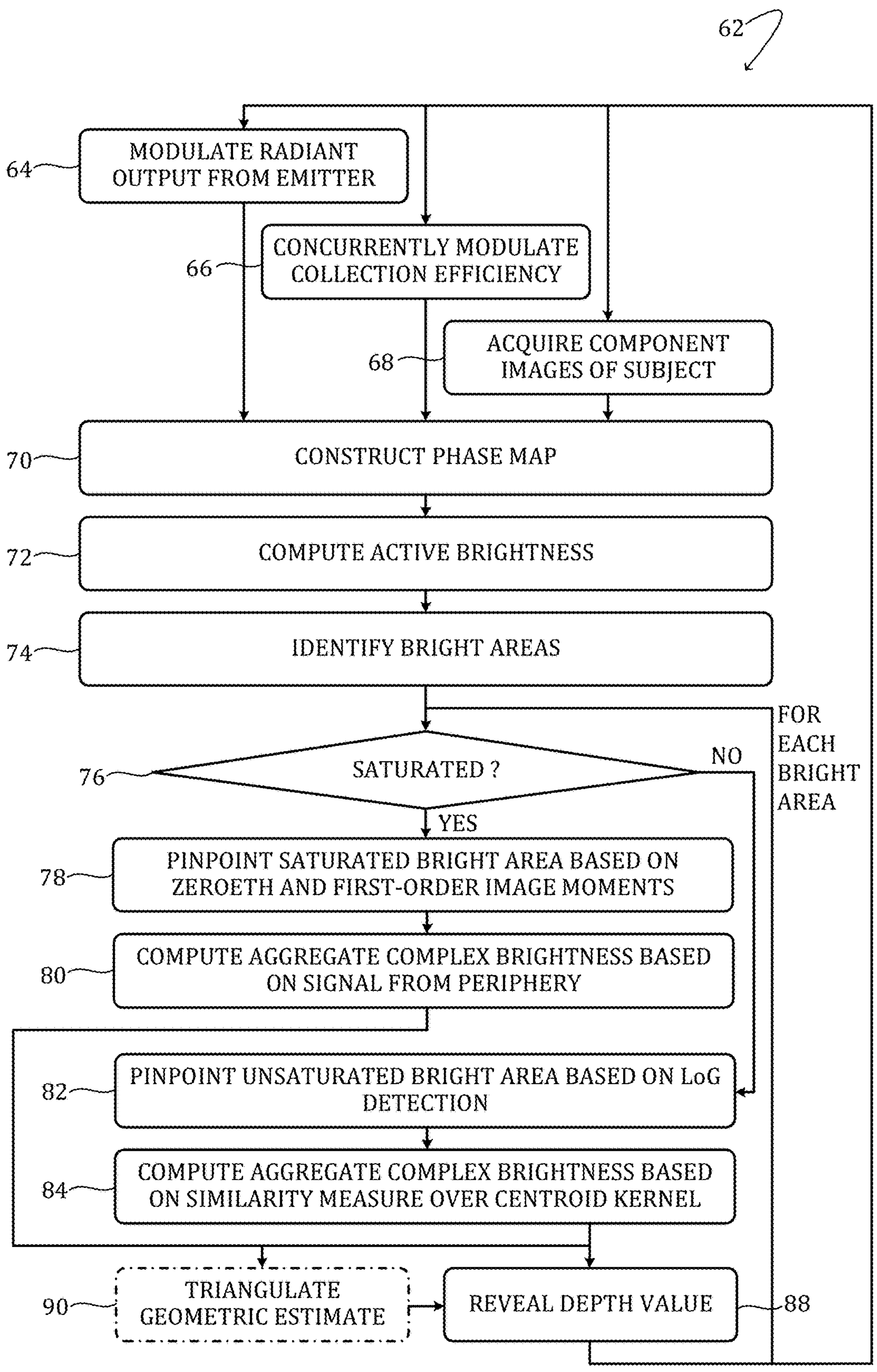
FIG. 7 shows aspects of an example method enacted in a depth-imaging system.

FIG. 7 shows aspects of an example method 62 enacted in a depth-imaging system coupled operatively to a computer as described herein.

At 64 of method 62, the modulation engine of the computer modulates, at one or more modulation frequencies, the radiant output of an emitter of the depth-imaging system. As noted hereinabove, the emitter is arranged optically upstream of a redistribution optic configured to sparsely project the radiant output onto the subject. By virtue of this configuration, the radiant output is redistributed in the form of numerous, discrete sparse-projection features. In some examples, each sparse-projection feature of the radiant output comprises a dot. In other examples, each sparse-projection feature comprises a pin.

At 66 the modulation engine modulates the charge-carrier collection at the imaging sensor array of the depth-imaging system by applying a modulated bias to the appropriate electrode structures of the imaging sensor array. The radiant output and the charge-carrier collection are modulated concurrently and synchronously at the one or more modulation frequencies—i.e., the respective modulation functions may be identical or may differ by a constant offset and/or scale factor. At 68 the acquisition engine of the computer acquires a plurality of raw shutters of the subject on the imaging sensor array. At 70 the image-resolution engine of the computer constructs a phase map of the subject based on the plurality of raw shutters. At 72 the image-resolution engine computes an active-brightness image based on the modulus of each phasor encoded in the phase map. At 74 the image-resolution engine identifies a plurality of bright areas of the phase map. Each of the bright areas corresponds to a sparse-projection feature of the radiant output reflecting from the subject. In some examples, the bright areas are identified with reference to the active-brightness image.

At 76, the image-resolution engine tests each of the bright areas for saturation—e.g., by comparing the real and imaginary phasor components of each pixel element of a bright area against a pre-determined threshold. For instance, in a scenario where each of the real and imaginary phasor components must lie within an interval of 0 to 65535, a threshold of 65000 may be used to indicate saturation; if both component values of a given pixel are below 65000, then that pixel may be identified as 'non-saturating' to downstream processing; if either component value of the pixel is above 65000, then the pixel may be identified as 'saturating'. In some examples, a given bright area may be identified as saturating if at least one of the pixels therein is saturated; otherwise the bright area may be identified as non-saturating. FIG. 8A shows a non-limiting example of an non-saturating bright area of a phase map. FIGS. 8B and 8C show a non-limiting example of a saturating bright area of a phase map. The example illustrated in FIG. 8B, where the brightness value is clipped at the threshold, should not be construed to limit the definition of the term 'saturating'. For instance, the methods herein are applicable also to soft saturation, where pixel values above a threshold are not necessarily clipped, but start to deviate from an expected (e.g., linear) response function.

At 78, the image-resolution engine pinpoints a plurality of saturating bright areas in the phase map—e.g., determines the location of the centroid C of each saturating bright area. In some examples the image-resolution engine determines the location of the centroid based on zeroeth- and first-order image moments, $$M_{mn} = \sum_x \sum_y x^m y^n L(x, y), \tag{3}$$

where the centroid position is given by $$(x_c, y_c) = \left(\frac{M_{10}}{M_{00}}, \frac{M_{01}}{M_{00}}\right), \tag{4}$$

and where L (x, y)=1 for saturated pixels and 0 otherwise.

In FIG. 8C, the larger circle represents a saturating bright area, where the solid line encloses 90% of the integrated signal intensity of that area and inscribes a kernel of pixels surrounding centroid position ($x_c$, $y_c$). Each of the small squares in this drawing represents one pixel of the kernel. In FIG. 7, for each of the saturating bright areas, the image processing engine computes, at 80, an aggregate phasor based on signal from the periphery of the bright area, agnostic to signal from the centroid C of the bright area. In FIG. 8C the periphery of the centroid is represented by the annular area outside of the dot-dashed smaller circle (defined according to the threshold in FIG. 8B) and the larger circle drawn with the solid line. More particularly, the act of computing the aggregate phasor $\hat{f}(x_c, y_c)$ for each saturating bright area may comprise computing a weighted average of valid phasor values within an interval of the centroid according to a weighting function $f$ that vanishes at the centroid. In some examples the 'interval of the centroid' may comprise the kernel of pixels as represented in FIG. 8C. In one example, $$\hat{f}(x_c, y_c) = \sum_X \sum_y \exp\left[\alpha(x - x_c)^2\right] \exp\left[\alpha(y - y_c)^2\right] f(x, y), \tag{5}$$

where α is a constant.

At 82 the image-processing engine pinpoints each non-saturating bright area via multi-scale Laplacian-of-Gaussian (LoG) blob detection (vide infra). In some examples the multi-scale LoG blob detection comprises a plurality of separable convolutions, for efficiency of computation. In some implementations the multi-scale LoG blob detection comprises assessing a blob response (e.g., filter response) across a plurality of scales. Alternative blob-detection algorithms are also envisaged.

At 84 the image-processing engine computes the aggregate phasor for each non-saturating bright area. The aggregate phasor is computed as a weighted average of valid phasor values within an interval of the centroid (e.g., kernel) according to a weighting function comprising a similarity measure between a measured phasor at the centroid and a measured phasor at pixels neighboring the centroid. In one example, $$\hat{f}(x_c, y_c) = \sum_x \sum_y \exp\left[\alpha(x - x_c)^2\right] \exp\left[\alpha(y - y_c)^2\right] \exp[dist(f(x, y), f(x_c, y_c))] f(x, y), \tag{6}$$

where dist($f$(x, y), $f(x_c, y_c)$) is a similarity measure between the measured phasor at the centroid and the phasor of neighbors. In some examples the aggregate complex intensity for each non-saturating bright area is computed via a joint bilateral filter.

At 88 the image-processing engine reveals a depth value based on the aggregate phasor. In some examples the image-processing engine phase-unwraps the aggregate phasor for each of the bright areas, to reveal the depth value. In some examples the image-processing engine also computes a confidence map corresponding to the matrix of depth values for every $(X, Y)_j$. Each depth value revealed at 88 is an iToF depth value. Optionally, the image-processing engine may also triangulate, at 90, a geometric estimate of the depth to the corresponding sparse-projection feature reflecting from the subject.

Figure 9A:
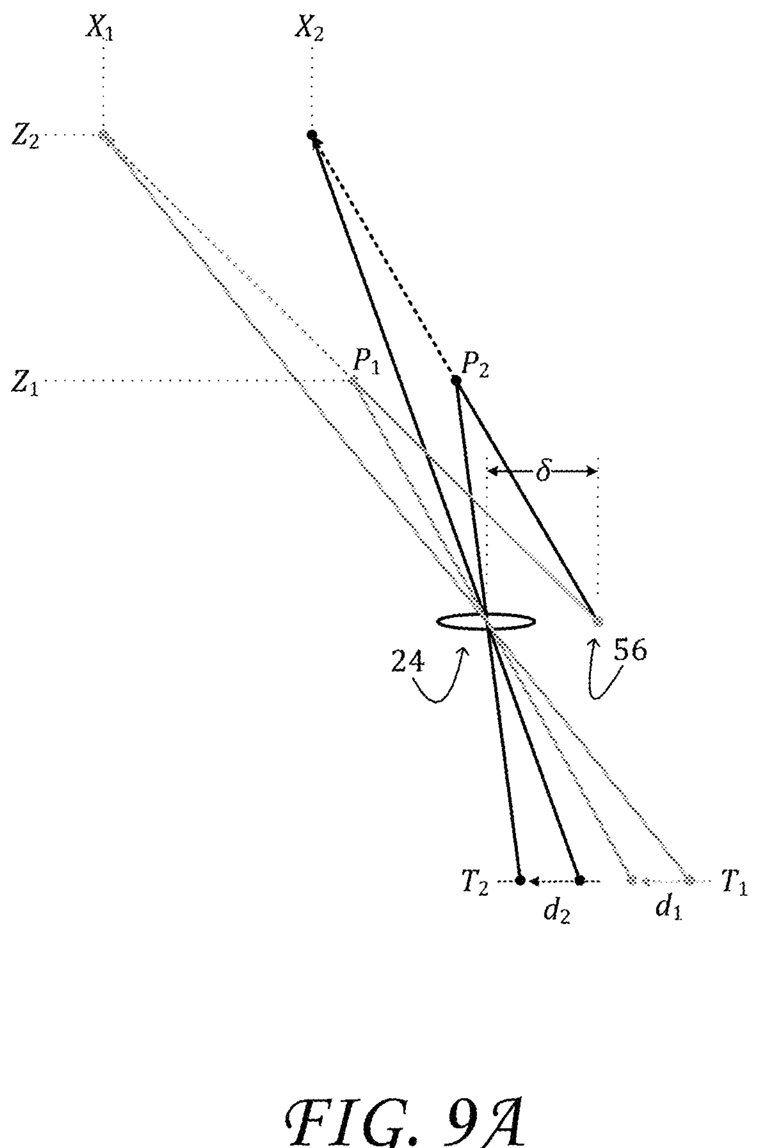

In some examples each geometric depth estimate can be based on the displacement of a given bright area of a phase map or active-brightness image from its calibration position. That aspect is shown in the plan view of FIG. 9A, wherein each displacement d varies with the corresponding depth coordinate Z along trajectory T. Generally speaking, the estimate for each Z value is proportional to the offset δ of the optical axis of objective lens 24 relative to the optical axis of redistribution optic 56 and inversely proportional to the corresponding displacement d. In some variants, the displacement can be computed with reference to a calibration image acquired, optionally, at 92 of method 62 and stored in the computer of the depth-imaging system. Moreover, data extracted from the calibration image may be used to reveal the constant of proportionality relating the geometric depth estimate to the displacement.

Figure 9B:
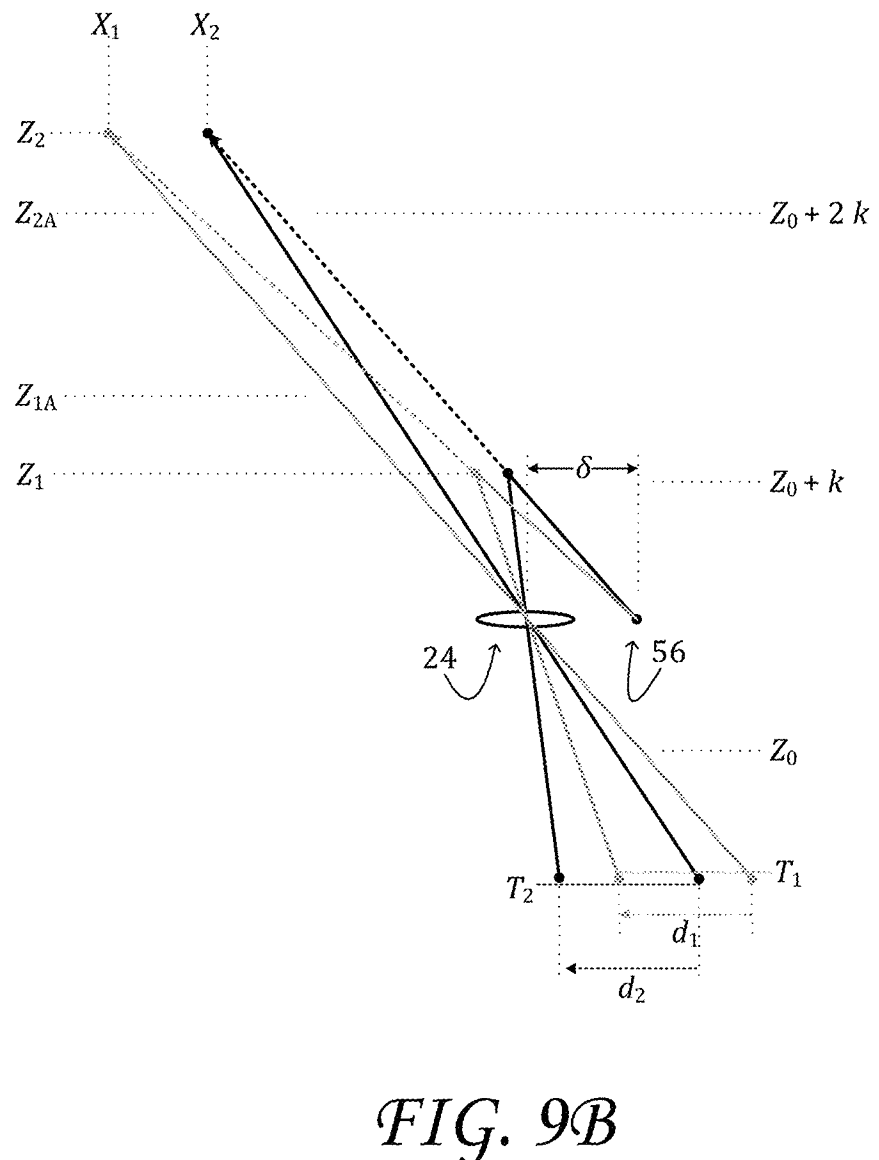

In some examples measuring a displacement d includes matching a bright area of a phase map or active-brightness image to the corresponding trajectory T. In the most straightforward scenario the trajectories corresponding to adjacent bright areas do not overlap because the angular separation between adjacent sparse-projection features is large relative to the length of the trajectories (as controlled by the ratio of the offset δ to the depth Z). This condition is illustrated by example in FIG. 9A. In other scenarios the trajectories corresponding to adjacent bright areas may overlap, as shown in FIG. 9B. When that is the case, each bright area can be matched to a corresponding trajectory using a disambiguation algorithm that factors in the phase information from the aggregate phasor (computed at 80 or 84) for that bright area.

Consider, with continued reference to FIG. 9B, an example in which a given bright area is located where trajectories $T_1$ and $T_2$ overlap. If this bright area were mapped to $T_1$ then the geometric depth estimate would be $Z_{1A}$; if the bright area were mapped to $T_2$ then the geometric depth estimate would be $Z_{2A}$. Now suppose that the aggregate phasor corresponding to the bright area is consistent with iToF depth values $Z_0$, $Z_0$+k, $Z_0$+2k, etc. In that case, whichever geometric depth estimate is closest one of the iToF depth values would be the estimate returned—$Z_{2A}$ in the illustrated example. In other examples where the trajectories corresponding to adjacent bright areas overlap, each bright area can be matched to a corresponding trajectory using a disambiguation algorithm based on frame-to-frame tracking of the bright areas (via tracking engine 54 of FIG. 2). In still other examples it may be unnecessary to map bright areas to trajectories, as the geometric depth estimate can be based on the separation between regularly distributed, adjacent bright areas. In these and other examples, the geometric depth estimate may be used, at 88, to inform the phase unwrapping of the aggregate phasor and thereby yield the appropriate iToF depth value.

As noted hereinabove, in examples in which the aggregate phasor is associated with a set of periodic depth values, phase unwrapping selects the return depth value from the set. An important technical effect of incorporating the geometric depth estimate in phase unwrapping is that it reduces the number of modulation frequencies and corresponding phase maps necessary to compute an unwrapped radial-distance map or the like. For instance, when no geometric depth estimate is available, three different (e.g., orthogonal) modulation frequencies may be required in order to compute a fully disambiguated radial-distance map. When a geometric depth estimate is available, phase unwrapping one, single phase map may yield fully disambiguated radial-distance map. In examples where one modulation frequency is mathematically sufficient to determine the depth values uniquely, a second modulation frequency can be added so that the solution becomes overdetermined, and statistical methods may be used to harvest increased S/N.

The block diagram of FIG. 10 shows additional aspects of method 62 in schematic detail. In FIG. 10 active-brightness image 94 (and calibration image 96, optionally) is received into de-noising/sharpening process 98. That process also applies filter kernel parameters 100 from image-processing engine 48. The de-noised and sharpened digital image is then provided to binarization and peak-detection process 102, which operates according to appropriate thresholds 104, also provided by the image-processing engine. The binarized and peak-detected digital image is then provided to LoG-centroid calculation process 106 and then to block-matching process 108. The block-matching process receives additional parameters 110 related to block size, search neighborhood, and the scan line and then passes the digital image to pixel-correspondence process 112. Downstream of the pixel correspondence process, the digital image is subjected to multi-reference measurement 114 and then to multi-frame measurement 116. Finally, a linear-fitting process 118 and depth calculation 120 are enacted on the digital image to reveal the matrix of depth values.

Returning briefly to FIG. 7, in some examples, depth values obtained via phase unwrapping for each of the bright areas are incorporated into an aggregate depth image (e.g., radial-distance map), which may be stored and/or furnished to any executing application as the output of method 62.

Figure 11:
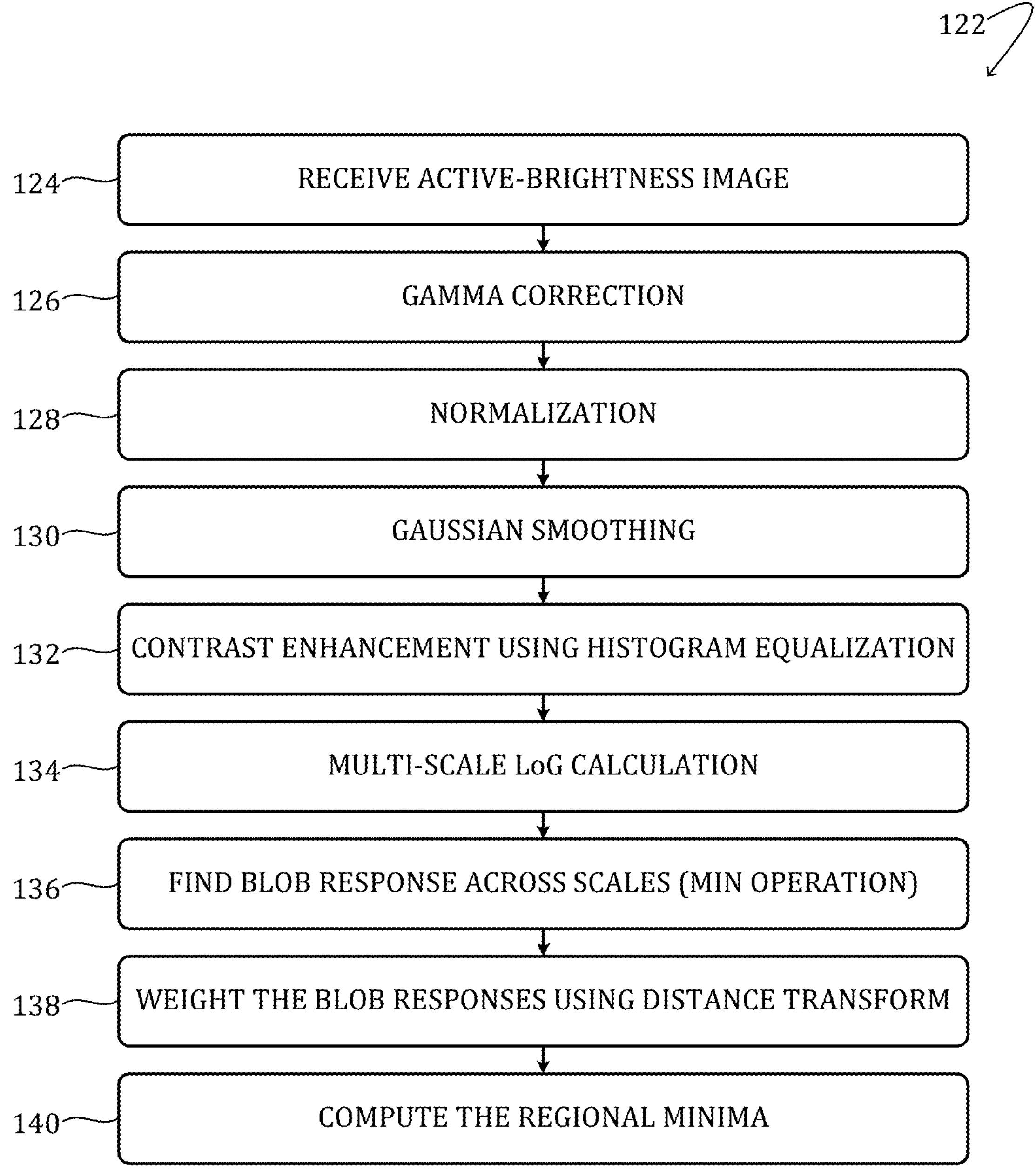
FIG. 11 shows aspects of an example method for multi-scale Laplacian-of-Gaussian detection as applied to the method of FIG. 7.

FIG. 11 shows aspects of an example method 122 for multi-scale LoG blob detection as applied to pinpointing dot centroids. As such, method 122 may be used as a particular, though non-limiting variant of step 82 of method 62. In method 122 separable convolutions may be used for efficiency of computation.

At 124 of method 122 the image-processing engine receives an active-brightness image of the subject. In some examples the active-brightness image may comprise an image with an array of bright dots corresponding to the sparse-projection features of the radiant output reflecting from the subject. At 126 the image processing engine gamma corrects the active-brightness image. At 128 the image processing engine normalizes the active-brightness image. At 130 the image processing engine applies Gaussian smoothing to the active-brightness image. At 132 the image processing engine applies contrast enhancement to the active-brightness image. In some examples, histogram equalization is used in the contrast enhancement. At 134 the image processing engine enacts the multi-scale LoG computation as described above, in the context of method 62. At 136 the image processing engine finds the blob response across a plurality of scales, thereby enacting a 'min' operation. At 138 the image processing engine weights the blob responses using a distance transform. At 140 the image processing engine computes the regional minima.

Figure 12:
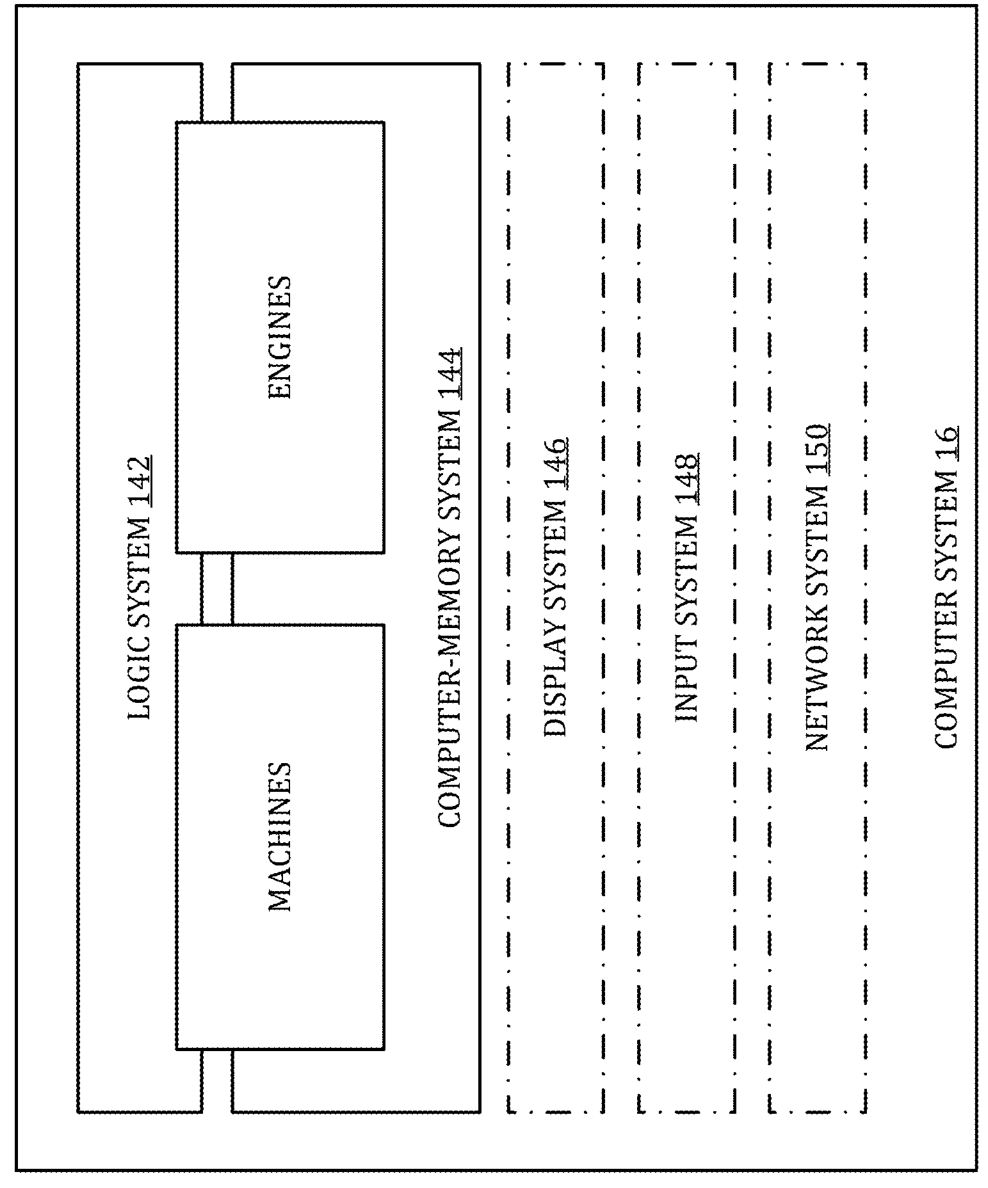
FIG. 12 shows aspects of an example computer system.

FIG. 12 provides another schematic representation of a computer system 16 configured to provide some or all of the computer system functionality disclosed herein. Computer system 16 may take the form of a personal computer, desktop or laptop computer, tablet or smartphone computer, game-system computer, head-mounted or wearable computer, application-server computer, or virtually any other kind of computing device.

Computer system 16 includes a logic system 142 and a computer-memory system 144. Computer system 16 may optionally include a display system 146, an input system 148, a network system 150, and/or other systems not shown in the drawings.

Logic system 142 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 144 includes at least one physical device configured to temporarily and/or permanently hold computer system information, such as data and instructions executable by logic system 142. When the computer-memory system includes two or more devices, the devices may be collocated or remotely located. Computer-memory system 144 may include at least one volatile, nonvolatile, dynamic, static, read/write, read-only, random-access, sequential-access, location-read addressable, file-read addressable, and/or content-read addressable computer-memory device. Computer-memory system 144 may include at least one removable and/or built-in computer-memory device. When the logic system executes instructions, the state of computer-memory system 144 may be transformed—e.g., to hold different data.

Aspects of logic system 142 and computer-memory system 144 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 142 and computer-memory system 144 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 146 may be used to present a visual representation of data held by computer-memory system 144. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 148 may comprise or interface with one or more input devices. An input device may include a sensor device or a user input device. Examples of user input devices include a keyboard, mouse, or touch screen.

When included, network system 150 may be configured to communicatively couple computer system 16 with one or more other computer systems. The network system may include wired and/or wireless communication devices compatible with one or more different communication protocols. The network system may be configured for communication via personal-, local- and/or wide-area networks.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

In conclusion, one aspect of this disclosure is directed to a method enacted in a depth imaging system. The method comprises: (a) modulating radiant output from an emitter at one or more modulation frequencies, the emitter arranged optically upstream of a redistribution optic configured to sparsely project the radiant output onto a subject; (b) modulating charge-carrier collection at an imaging sensor array at the one or more modulation frequencies; (c) acquiring a plurality of raw shutters of the subject on the imaging sensor array; (d) constructing a phase map of the subject based on the plurality of raw shutters; (e) pinpointing in the phase map a plurality of bright areas corresponding each to a sparse-projection feature of the radiant output reflecting from the subject; and for each of the plurality of bright areas: (i) triangulating an estimate of depth to the corresponding sparse-projection feature reflecting from the subject, (ii) computing an aggregate phasor, and (iii) phase unwrapping the aggregate phasor based partly on the estimate, to reveal a depth value.

In some implementations each sparse-projection feature of the radiant output comprises a dot. In some implementations the aggregate phasor is associated with a set of periodic depth values, and the phase unwrapping selects the depth value from the set. In some implementations pinpointing the plurality of bright areas comprises pinpointing based on zeroeth- and first-order image moments. In some implementations pinpointing the plurality of bright areas comprises pinpointing via multi-scale Laplacian-of-Gaussian detection. In some implementations pinpointing the plurality of bright areas comprises computing a centroid of each of the plurality of bright areas. In some implementations the estimate is based on a displacement of the bright area from a calibration position along a trajectory, and the estimate is inversely proportional to the displacement. In some implementations measuring the displacement includes matching each bright area to a corresponding trajectory. In some implementations the trajectories corresponding to adjacent bright areas do not overlap. In some implementations the trajectories corresponding to adjacent bright areas overlap, and the matching is based in part on the aggregate phasor. In some implementations the method further comprises acquiring and storing a calibration image, and a constant of proportionality relating the estimate to the displacement is based in part on the calibration image. In some implementations the aggregate complex intensity for each non-saturating bright area is computed via a joint bilateral filter.

Another aspect of this disclosure is directed to a depth-imaging system comprising an emitter configured to emit a modulated radiant output, a redistribution optic arranged optically downstream of the emitter and configured to sparsely project the radiant output onto a subject, an imaging sensor array configured to acquire a plurality of raw shutters of the subject, and a computer. The computer is configured to: (a) modulate the radiant output of the emitter and a charge-carrier collection at the imaging sensor at one or more modulation frequencies, (b) construct a phase map of the subject based on the plurality of raw shutters, (c) pinpoint in the phase map a plurality of bright areas corresponding each to a sparse-projection feature of the radiant output reflecting from the subject; and (d) for each of the plurality of bright areas: (i) triangulate an estimate of depth to the corresponding sparse-projection feature reflecting from the subject, (ii) compute an aggregate phasor, and (iii) phase unwrap the aggregate phasor based partly on the estimate, to reveal a depth value.

In some implementations each sparse-projection feature of the radiant output comprises a dot. In some implementations the aggregate phasor is associated with a set of periodic depth values, and the phase unwrapping selects the depth value from the set. In some implementations the estimate is based on a separation between adjacent bright areas.

Another aspect of this disclosure is directed to a method enacted in a depth-imaging system. The method comprises: (a) modulating radiant output from an emitter at one or more modulation frequencies; (b) projecting the radiant output as a plurality of sparse-projection features; (c) acquiring a plurality of raw shutters on an imaging sensor array modulated at the one or more modulation frequencies; (d) triangulating a geometric estimate of depth to a subject locus reflecting a sparse-projection feature; and (e) returning a time-of-flight value of the depth based on a phase computed from the plurality of raw shutters and on the geometric estimate of the depth.

In some implementations each sparse-projection feature of the radiant output comprises a dot. In some implementations the one or more modulation frequencies comprise only two modulation frequencies. In some implementations the one or more modulation frequencies comprise only one modulation frequency.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method enacted in a depth imaging system, the method comprising:

modulating radiant output from an emitter at one or more modulation frequencies, the emitter arranged optically upstream of a redistribution optic configured to sparsely project the radiant output onto a subject;

modulating charge-carrier collection at an imaging sensor array at the one or more modulation frequencies;

acquiring a plurality of raw shutters of the subject on the imaging sensor array;

constructing a phase map of the subject based on the plurality of raw shutters;

pinpointing in the phase map a plurality of bright areas corresponding each to a sparse-projection feature of the radiant output reflecting from the subject; and for each of the plurality of bright areas:

triangulating an estimate of depth to the corresponding sparse-projection feature reflecting from the subject, wherein the estimate is based on a displacement of the bright area from a calibration position along a trajectory, computing an aggregate phasor, and phase unwrapping the aggregate phasor based partly on the estimate, to reveal a depth value.

2. The method of claim 1 wherein each sparse-projection feature of the radiant output comprises a dot.

3. The method of claim 1 wherein the aggregate phasor is associated with a set of periodic depth values, and wherein the phase unwrapping selects the depth value from the set.

4. The method of claim 1 wherein pinpointing the plurality of bright areas comprises pinpointing based on zeroeth- and first-order image moments.

5. The method of claim 1 wherein pinpointing the plurality of bright areas comprises pinpointing via multi-scale Laplacian-of-Gaussian detection.

6. The method of claim 1 wherein pinpointing the plurality of bright areas comprises computing a centroid of each of the plurality of bright areas.

7. The method of claim 1 wherein the estimate is inversely proportional to the displacement.

8. The method of claim 7 further comprising acquiring and storing a calibration image, wherein a constant of proportionality relating the estimate to the displacement is based in part on the calibration image.

9. The method of claim 1 wherein measuring the displacement includes matching each bright area to a corresponding trajectory.

10. The method of claim 9 wherein the trajectories corresponding to adjacent bright areas do not overlap.

11. The method of claim 10 wherein the aggregate complex intensity for each non-saturating bright area is computed via a joint bilateral filter.

12. The method of claim 9 wherein the trajectories corresponding to adjacent bright areas overlap, and wherein the matching is based in part on the aggregate phasor.

13. A depth-imaging system comprising:

an emitter configured to emit a modulated radiant output;

a redistribution optic arranged optically downstream of the emitter and configured to sparsely project the radiant output onto a subject;

an imaging sensor array configured to acquire a plurality of raw shutters of the subject;

a computer configured to:

modulate the radiant output of the emitter and a charge-carrier collection at the imaging sensor at one or more modulation frequencies, construct a phase map of the subject based on the plurality of raw shutters, pinpoint in the phase map a plurality of bright areas corresponding each to a sparse-projection feature of the radiant output reflecting from the subject; and for each of the plurality of bright areas: triangulate an estimate of depth to the corresponding sparse-projection feature reflecting from the subject, wherein the estimate is based on a displacement of the bright area from a calibration position along a trajectory, compute an aggregate phasor, and phase unwrap the aggregate phasor based partly on the estimate, to reveal a depth value.

14. The depth-imaging system of claim 13 wherein each sparse-projection feature of the radiant output comprises a dot.

15. The depth-imaging system of claim 13 wherein the aggregate phasor is associated with a set of periodic depth values, and wherein the phase unwrapping selects the depth value from the set.

16. The depth-imaging system of claim 13 wherein the estimate is based on a separation between adjacent bright areas.

17. A method enacted in a depth-imaging system, the method comprising:

modulating radiant output from an emitter at one or more modulation frequencies;

projecting the radiant output as a plurality of sparse-projection features;

acquiring a plurality of raw shutters on an imaging sensor array modulated at the one or more modulation frequencies;

triangulating a geometric estimate of depth to a subject locus reflecting a sparse-projection feature, wherein the geometric estimate of depth is based on a displacement of a bright area in a phase map derived from the plurality of raw shutters from a calibration position along a trajectory, the bright area corresponding to the sparse-projection feature reflected from the subject locus; and returning a time-of-flight value of the depth based on a phase computed from the plurality of raw shutters and on the geometric estimate of the depth.

18. The method of claim 17 wherein each sparse-projection feature of the radiant output comprises a dot.

19. The method of claim 17 wherein the one or more modulation frequencies comprise only two modulation frequencies.

20. The method of claim 17 wherein the one or more modulation frequencies comprise only one modulation frequency.

* * * * *